United States Patent [19]

Alegre et al.

[11] 4,335,060
[45] Jun. 15, 1982

[54] MULTI-FUEL VAPOR CHARGE CARBURETION SYSTEM AND DEVICE THEREFOR

[76] Inventors: Adolfo P. Alegre, No. 119 Bignay St., Project II, Quezon City; Armando E. Guidote, Antipolo, Rizal; Alfonso G. Puyat, No. 7 Caimito St., Forbes Park, Makati, Metro Manila, all of Philippines

[21] Appl. No.: 132,988

[22] Filed: Mar. 24, 1980

[30] Foreign Application Priority Data

Sep. 7, 1979 [PH] Philippines ............................ 23009
Oct. 18, 1979 [PH] Philippines ............................ 23189

[51] Int. Cl.³ .......................................... F02M 17/22
[52] U.S. Cl. ............................. 261/23 R; 261/36 A; 261/122; 261/79 R; 261/64 R; 261/61; 48/144
[58] Field of Search ............... 261/23 R, 36 A, 122, 261/79 R, 64 R, 61; 48/144, 219

[56] References Cited

U.S. PATENT DOCUMENTS

| | | | |
|---|---|---|---|
| 2,702,694 | 2/1955 | Featherston | 261/23 A |
| 2,742,886 | 4/1956 | McPherson | 261/122 |
| 2,795,493 | 6/1957 | Gochoel | 48/144 |
| 2,968,474 | 1/1961 | Eichelman et al. | 261/DIG. 65 |
| 3,291,117 | 12/1966 | Shenkin | 261/DIG. 15 |
| 3,346,245 | 10/1967 | Mennesson | 261/61 |
| 3,877,449 | 4/1975 | High | 261/79 R |
| 3,944,634 | 3/1976 | Gerlach | 261/79 R |

*Primary Examiner*—Tim R. Miles
*Attorney, Agent, or Firm*—Munson H. Lane; Munson H. Lane, Jr.

[57] ABSTRACT

A fuel vapor producing device comprising a liquid fuel or mixture bowl-shape container; an associated cover for said container having a fuel inlet valve; and a float secured in said device, said cover integrally incorporating therewith a cylindrical air filter housing disposed vertically and concentrically on top thereof; an air agitator duct integrated in said device extending from the air filter housing to the bottom thereof to agitate the fuel or mixture therein; another air duct in said air filter housing, said air duct extending to the inside of said container having an outwardly bent portion to produce a swirling effect of the air to achieve a higher degree of mixture; a multi air jet selector disc provided on said air filter housing, said selector disc having a plurality of spaced holes of gradually increasing apertures adapted to the air duct opening on said housing, the opening of said air ducts depending on the requirement of an engine piston displacement to control the air-fuel mixture of the engine; a baffle inside the device to minimize the fuel splashing; a vapor outlet directly connected to the intake manifold and an air bleed jet provided on said vapor outlet to feed sufficient flow of air vapor mixture to the intake manifold.

2 Claims, 7 Drawing Figures

4,335,060

MULTI-FUEL VAPOR CHARGE CARBURETION SYSTEM AND DEVICE THEREFOR

This application is related to applicants' co-pending U.S. patent application Ser. No. 132,786, filed Mar. 24, 1980, and it corresponds with applicants' Philippines patent application Ser. No. 23,189, filed Oct. 18, 1979, now Philippines Pat. No. 13247, issued Feb. 20, 1980. The aforesaid Philippines patent application Ser. No. 23,189 is a continuation-in-part of Philippines patent application Ser. No. 23,009, filed Sept. 7, 1979, now Philippines Pat. No. 13,248, issued Feb. 20, 1980, to which the applicants' U.S. application Ser. No. 132,786 corresponds.

This invention relates in general to internal combustion engine, and more particularly to a new method of fuel carburetion to form a vapor charge for combustion in internal combustion engines and the device therefor.

One of the most common carburetion device used today is the automobile carburetor adapted to vaporize the liquid fuel and mix it to the proper amount of atmospheric air for combustion in the combustion chamber of the engine. The finer the fuel mist formed, the better combustion of the vaporized liquid fuel will take place, thus utilizing to the maximum the heat energy of the fuel to give and produce a clean exhaust gas and a potential increase in power.

However, since the carburetor is a mechanical device, it has to be adjusted now and then, turned and set regularly to the right setting to obtain a good or ideal air-fuel mixture.

It is also an accepted fact, that fuel in vapor form is more combustible than fuel in liquid state, such that complete combustion of the vapor fuel is more attainable than fuel in liquid form. The more complete the combustion the fuel is subjected to, the greater the heat utilization of the fuel attained.

In said Philippines application Ser. No. 23009, applicants' discovered that the supply and control of air to agitate the fuel or mixture in the device to attain a proper amount of vapor charge sufficient to supply any engine piston displacement seems insufficient. In large capacity engines, more vapor charge from the device is required and as such, a variable control means should be provided to properly adjust the amount of air to agitate the fuel or mixture and to control the air-fuel mixture ratio. A further drawback is in the lack of providing a continuous supply of fresh fuel in the device.

It has also been observed that fuel movement or splashing is created inside the device in passing over rough roads, bumps or sudden stops and sharp turns, resulting in the disruption of the air fuel mixture.

It is therefore, a principal object of the present invention to provide an improved vapor charge producing device wherein a multi-air jet selector disc is incorporated whereby the air/fuel mixture ratio for any engine piston displacement could be attained.

A further object of this invention is to provide a vapor carburetion device wherein a fuel return line having a fuel return valve is incorporated to insure continuous supply of fresh fuel.

It is also the object of this invention to provide baffles inside the device to minimize the fuel splashing.

Another object of the invention is to provide a vapor carburetion device, the construction of which is simplified by integrating the air filter unit and the air ducts to the body to make the device more compact, and by simplifying the fuel or mixture bubbler to make it more effective and easily replaceable.

It is also an object of this invention to provide a new carburetion system and device which will give the engine a clean exhaust gas.

A further object of this invention is to provide a new vapor carburetion device which could be constructed and manufactured with simple devices and equipments.

A still further object of this invention is to provide a new system of fuel carburetion and device which can use different kinds of liquid fuel or mixture.

These objects and other advantages of this invention will come to light and the invention will be fully and completely understood by reading the detailed description in the specification when taken in conjunction with the accompanying drawings, wherein.

Figure 1:
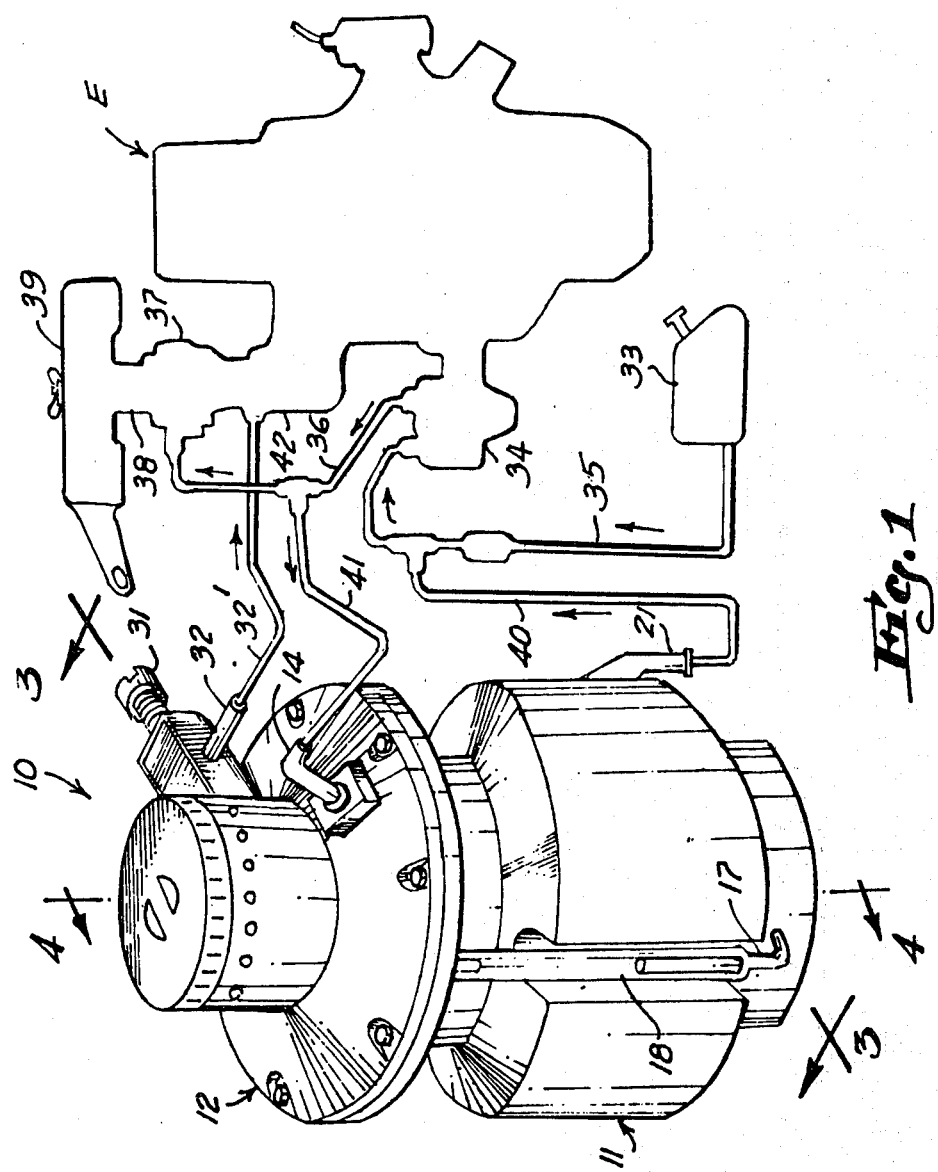
FIG. 1 is a perspective view of the new vapor carburetion device in accordance with the present invention and showing its connection to an internal combustion engine.

Referring now to the drawings in detail, there is shown in FIG. 1 the vapor charge producing device indicated in its entirety as 10. Device 10 is a bowl-shaped container 11 provided with a removable cover 12. The container can, of course, vary in shape. The device is provided with a float 13 having a valve control 13a to control the fuel or mixture level inside the bowl by way of the fuel or mixture inlet 14 made on the cover 12.

The bowl 11 is provided with an annular flange 15 at its upper end having a vertically disposed air agitator duct 16 slightly extending at its upper and lower face thereof. At the bottom of said bowl is provided with a companion air agitator duct 17 disposed in vertical alignment with the air duct 16, said duct 17 extending to the center of the inner bottom surface of said bowl. A transparent plastic tube 18 provided with a reading scale is fittingly inserted between the air ducts 16 and 17. A foam-mesh wire bubbler 19 is secured on top of the discharge opening of the duct 17 such that the air entering in said air agitator duct creates tiny bubbles which agitate the fuel therein.

Also provided at the inner wall near the bottom of the bowl is a fuel return valve 20 having an outlet 21 adapted to be connected to a fuel return pipe or tube. It should be noted that the fuel in the bowl is vaporized by agitation and after quite a time, the less volatile fraction increases. The fuel return valve 20 allows the return of quality fuel which is supplied by the fuel pump from the tank to insure consistent supply of quality fuel for uniform and sufficient vapor charge.

The bowl cover 12 is secured to the annular flange 15 of the bowl by the bolts 15a. On top of the cover 12 is a concentrically integrated cylindrical filter housing 22 having a removable cover 23. A plurality of closely spaced air inlets 24 are disposed circumferentially in said housing and at the bottom is provided with an air duct 25 extending to and adapted to connect with the air agitator duct 16. Adjacent said air duct 25 is a larger diameter air duct 26 which extends downwardly to the inside of said bowl and terminates a distance above the fuel. The air duct 26 is provided with a bent portion 26a to provide a swirling movement of the air above the fuel. An air bleed jet 27 connects the upper portion of the air duct 26 to the main vapor outlet 28. A fuel splash guard 28a is provided below the vapor outlet 28.

Figure 2:
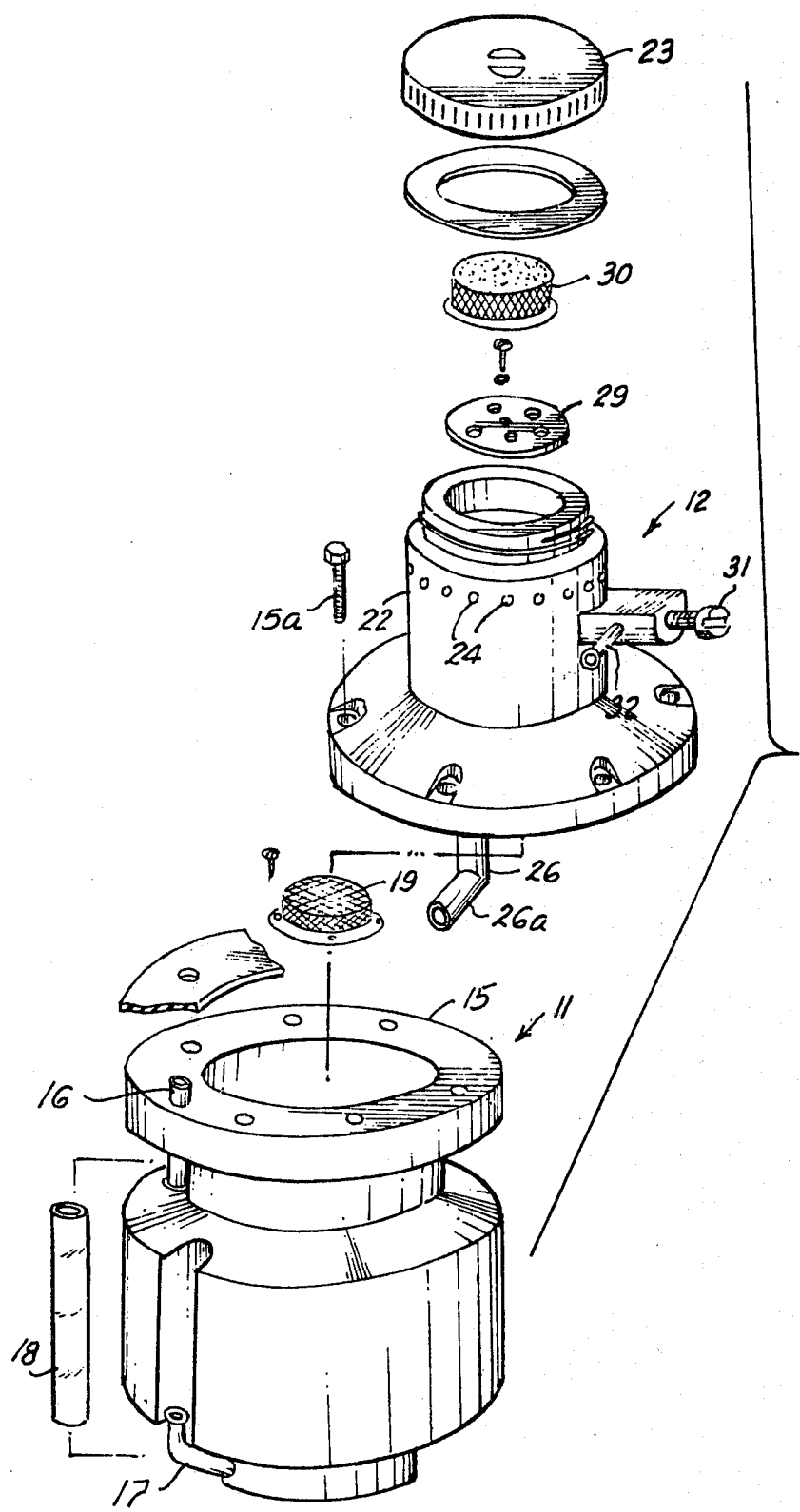
FIG. 2 is an exploded perspective view of the carburetion device in FIG. 1.
Figure 3:
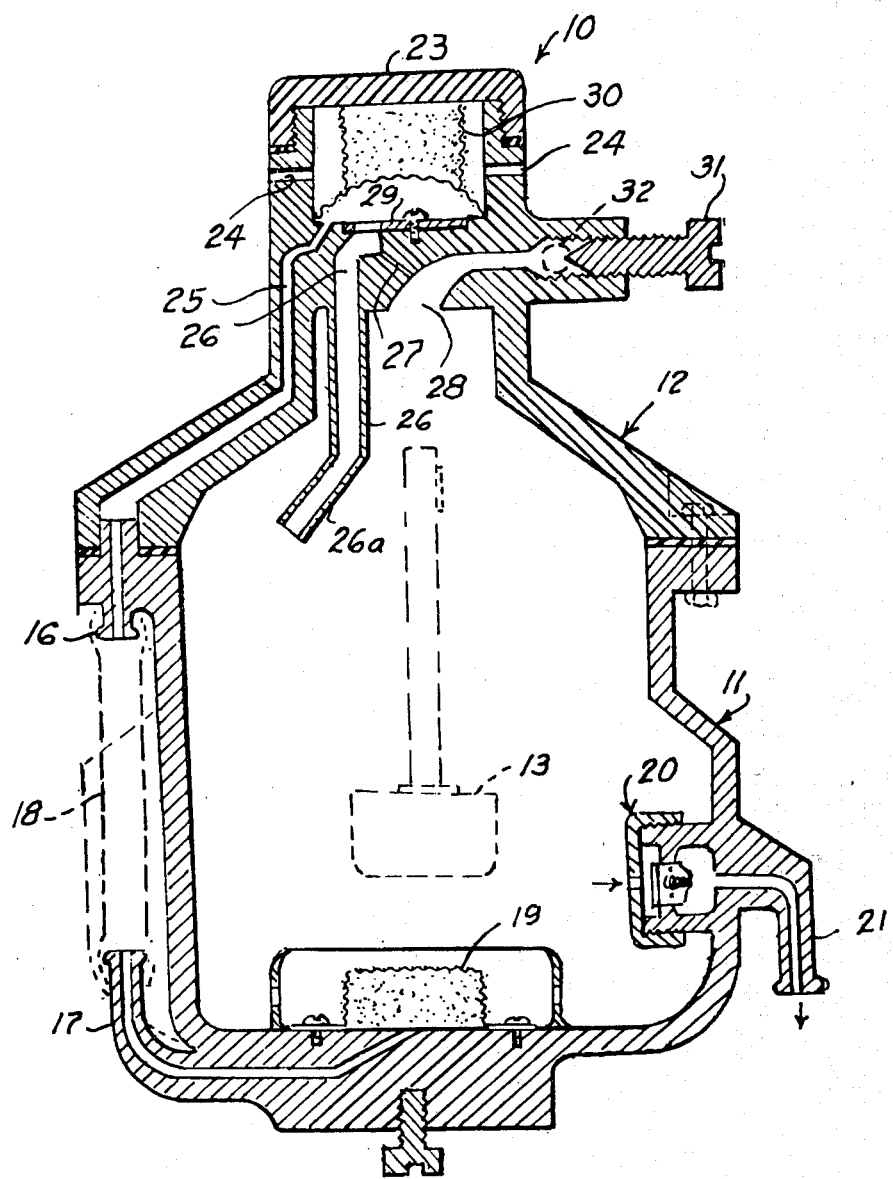
FIG. 3 is a cross-sectional view taken along line 3—3 of FIG. 1.
Figure 4:
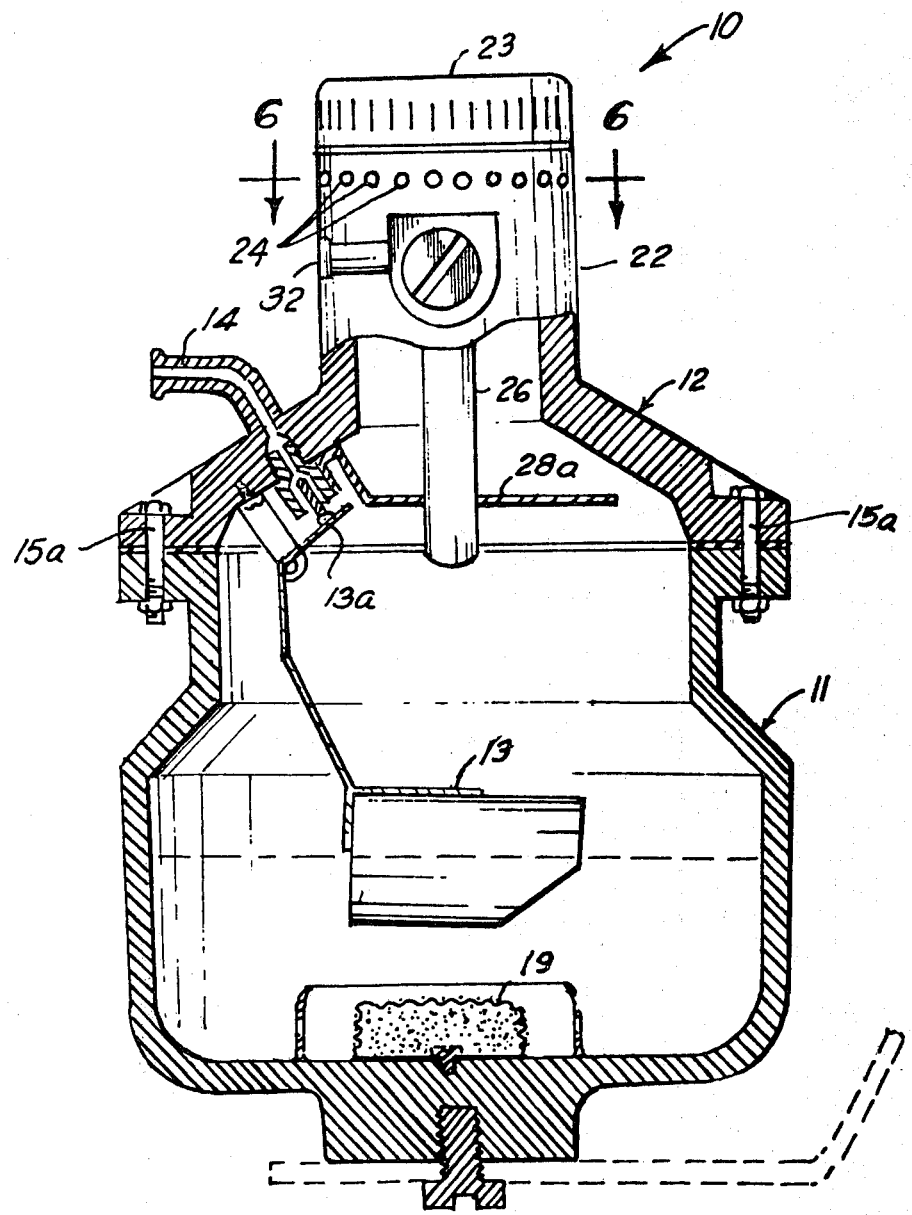
FIG. 4 is a cross-sectional view taken along line 4—4 of FIG. 1.
Figure 5:
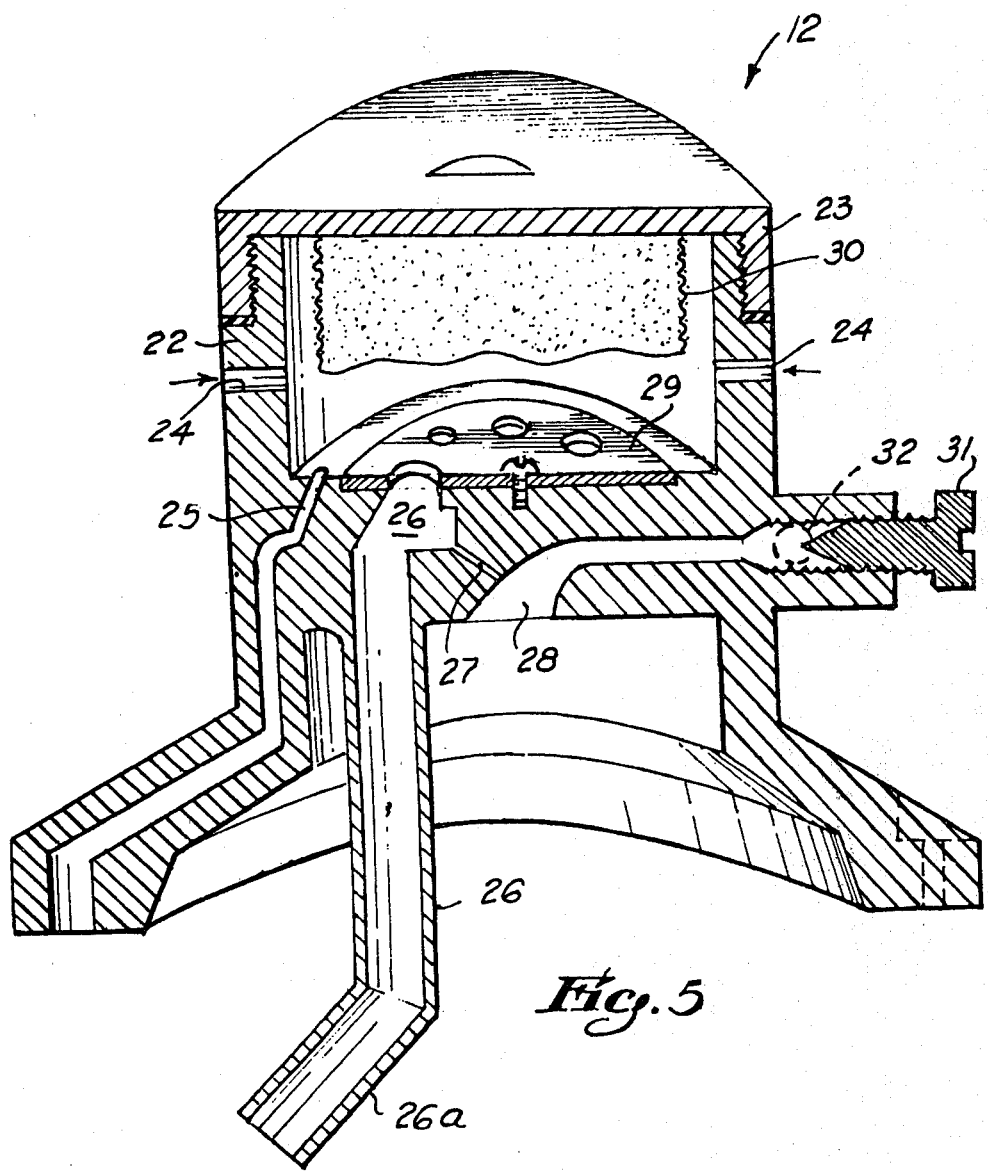
FIG. 5 is a cross-sectional view of the device in FIG. 1.
Figure 6:
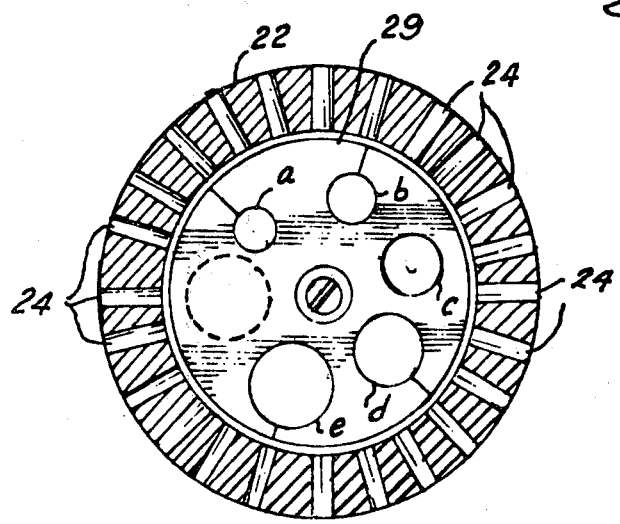
FIG. 6 is a cross-sectional view taken along line 6—6 of FIG. 4.

A multi-air jet selector disc 29 is adjustably secured at the bottom surface of the filter housing 22 by means of a screw. A foam/mesh screen air filter 30 is provided on top of said selector disc. As clearly shown in FIGS. 2 and 6, said selector disc is provided with a series of spaced holes or apertures a, b, c, d and e, having gradually increasing diameters and positioned in such a manner that the center each of said holes coincides with the center of air duct 26. The openings regulate the air fuel mixture of the vapor charge.

The main vapor outlet 28 is provided with a vapor flow control 31 and a final vapor discharge opening 32. The air bleed jet 27 which is tapped from the air duct 17 induces greater vapor flow at the main vapor outlet 28.

Figure 7:
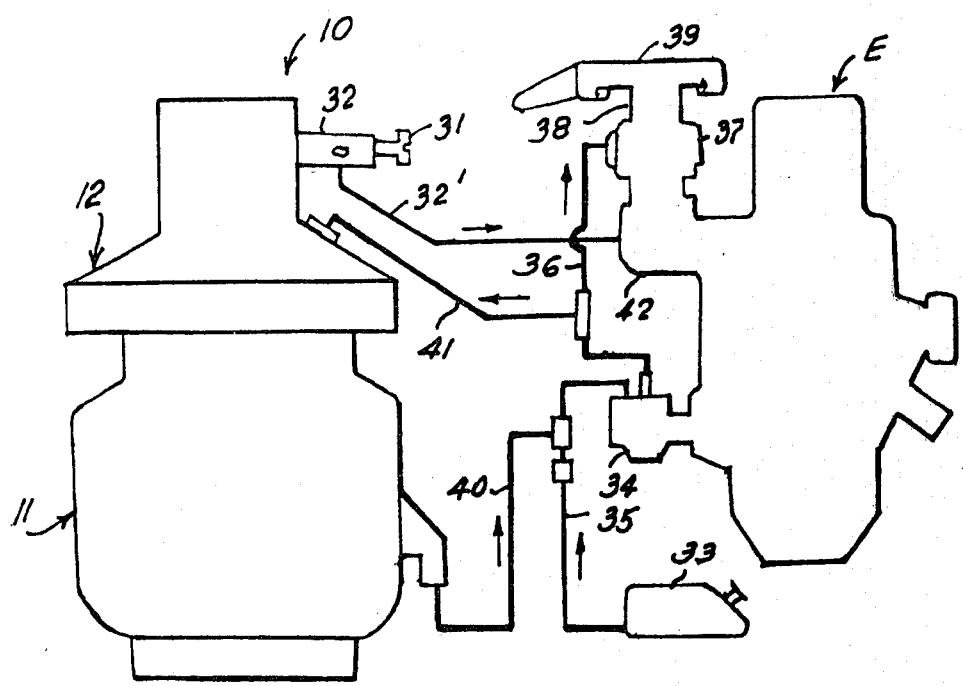
FIG. 7 is a schematic diagram of the system of fuel carburetion and device therefor as connected to an internal combustion engine.

FIGS. 1 and 7 shows the schematic connection of the system, which shows the vapor charge producing device 10 connected to an internal combustion engine "E".

Engine "E" is provided with a fuel tank 33 connected to a fuel pump 34 by the pipe 35 and pipe 36 which is connected to the carburetor 37. The carburetor 37 has an air inlet 38 provided with an air filter 39.

A fuel return pipe or tube 40 is tapped to the fuel line 35 before the fuel pump, and withdraws a controlled amount of fuel in the bowl 11 to be mixed with the fresh supply of fuel from the tank 33.

Device 10 receives fuel from the fuel supply pipe 41 connected to the fuel line 36 between the fuel pump and the carburetor. Vapor from the device 10 is discharged through opening 32 connected by pipe 32' to the engine's intake manifold which is provided with a check valve.

OPERATION

When the engine "E" is started, fresh fuel from the tank 33 is directly supplied to the vapor charge producing device 10 by the fuel pump 34 via the fresh supply pipe 41 until the desired level is attained as controlled by the float 13 to close the fuel inlet 14. A gradual shift over to vapor charges is made by opening the vapor valve 31 and at the same time closing down the carburetor by closing the air fuel mixture adjusting screw and the throttle valve.

As the engine "E" runs on idling, vacuum is created in the intake manifold 42, thus also creating a vacuum in the device 10 through pipe 32'. As vacuum is created inside the device 10, atmospheric air now enters the device through the air inlets 24, air filter 30, air agitator ducts 16, 17 via the air duct 25 and the air duct 26 which extends inside the bowl. The opening of the air duct 26 is controlled by the multi-air jet selector disc 29. As air enters the device, through the air agitator ducts 16, 17 air is distributed by the foammesh wire bubbler 19 to agitate the fuel and vaporize some of the fuel. Vapor mixes with air inside the bowl. The mixture of vapor and air inside the device is sucked and drawn upwards to the main vapor outlet 28. More air is mixed through bleed jet 27.

What we claim as new is:

1. A fuel vapor producing device comprising a liquid fuel or mixture bowl-shape container; an associated cover for said container having a fuel inlet valve; and a float secured in said device, said cover integrally incorporating therewith a cylindrical air filter housing disposed vertically and concentrically on top thereof; an air agitator duct integrated in said device extending from the air filter housing to the bottom thereof to agitate the fuel or mixture therein; another air duct in said air filter housing, said air duct extending to the inside of said container having an outwardly bent portion to produce a swirling effect of the air to achieve a higher degree of mixture; a multi air jet selector disc provided on said air filter housing, said selector disc having a plurality of spaced holes of gradually increasing apertures adapted to the air duct opening on said housing, the opening of said air ducts depending on the requirement of an engine piston displacement to control the air-fuel mixture of the engine; a baffle inside the device to minimize the fuel splashing; a vapor outlet directly connected to the intake manifold and an air bleed jet provided on said vapor outlet to feed sufficient flow of air vapor mixture to the intake manifold.

2. A fuel vapor producing device in accordance with claim 1, further comprising a fuel return valve secured inside or to the device proximate the bottom portion thereof, said fuel return valve being connected to the fuel line before the fuel pump of the engine to ensure consistent supply of quality fuel into the device for uniform and sufficient vapor charge.

* * * * *